US008892962B2

(12) United States Patent  
Iwanaga et al.

(10) Patent No.: US 8,892,962 B2  
(45) Date of Patent: Nov. 18, 2014

(54) VIRTUAL COMPUTER SYSTEM HAVING SR-IOV COMPLIANT DEVICE MOUNTED THEREON AND FAILURE DETECTION METHOD

(71) Applicant: Hitachi, Ltd., Tokyo (JP)

(72) Inventors: Miho Iwanaga, Tokyo (JP); Masahiko Yamauchi, Tokyo (JP); Daisuke Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 13/628,681

(22) Filed: Sep. 27, 2012

(65) Prior Publication Data

US 2013/0151908 A1    Jun. 13, 2013

(30) Foreign Application Priority Data

Dec. 7, 2011    (JP) ................................ 2011-268263

(51) Int. Cl.  
*G06F 11/00* (2006.01)

(52) U.S. Cl.  
USPC .......................................................... 714/48

(58) Field of Classification Search  
CPC .................. G06F 2009/45579; G06F 9/45558; G06F 11/3485; G06F 2009/45587; G06F 9/5077; G06F 11/301  
See application file for complete search history.

(56) References Cited

U.S. PATENT DOCUMENTS

| 8,156,253 | B2 | 4/2012 | Watanabe | |
|---|---|---|---|---|
| 2004/0187106 | A1* | 9/2004 | Tanaka et al. | 718/1 |
| 2009/0276773 | A1* | 11/2009 | Brown et al. | 718/1 |
| 2009/0313391 | A1* | 12/2009 | Watanabe | 710/8 |
| 2011/0179214 | A1* | 7/2011 | Goggin et al. | 711/6 |
| 2013/0042238 | A1* | 2/2013 | Cardona et al. | 718/1 |

FOREIGN PATENT DOCUMENTS

JP    2009-301162 A    12/2009

OTHER PUBLICATIONS

Hitachi, Ltd., "Hardware maintenance agent configuration guide", BS2000, Sep. 2010 (The 7th edition), p. 10 with its English Translation.

Intel, "Intel 82599 SR-IOV Driver Companion Guide", Revision 1.00, May 2010, p. 8.

* cited by examiner

*Primary Examiner* — Charles Ehne  
(74) *Attorney, Agent, or Firm* — Mattingly & Malur, PC

(57) ABSTRACT

A failure detection method including: detecting, by a virtual computer, occurrence of the failure in a virtual function of an I/O device; acquiring, a virtual device name corresponding to the virtual function in which the failure has occurred; referring, to device information retaining a virtual device name of the I/O device assigned to the virtual computer and VF specific information on the I/O device, thereby acquiring the VF specific information based on the acquired virtual device name; transmitting, the acquired VF specific information to the host; referring, by the host, to I/O correspondence information retaining a slot number of a slot in which the I/O device is mounted, and VF specific information, thereby acquiring the slot number corresponding to the VF specific information received from the virtual computer; and identifying, the acquired slot number as the slot number of the I/O device on which the failure has occurred.

14 Claims, 9 Drawing Sheets

| LINE NUMBER (1111) | VIRTUAL DEVICE NAME (1112) | VF SPECIFIC INFORMATION (1113) |
|---|---|---|
| 1 | VIRTUAL DEVICE 1 | MAC ADDRESS 1 |
| 2 | VIRTUAL DEVICE 2 | MAC ADDRESS 2 |
| 3 | VIRTUAL DEVICE 3 | WWN1 |

| LINE NUMBER (1141) | SLOT NUMBER (1142) | SR-IOV DEVICE NAME (1143) | VF NAME (1144) | VF SPECIFIC INFORMATION (1145) | PORT NUMBER (1146) |
|---|---|---|---|---|---|
| 1 | 1 | SR-IOV DEVICE 1 | VF1 | MAC ADDRESS 1 | 1 |
| 2 | 1 | SR-IOV DEVICE 1 | VF2 | MAC ADDRESS 2 | 2 |
| 3 | 2 | SR-IOV DEVICE 2 | VF1 | WWN1 | 1 |
| 4 | 2 | SR-IOV DEVICE 2 | VF2 | WWN2 | 2 |

VIRTUAL COMPUTER SYSTEM HAVING SR-IOV COMPLIANT DEVICE MOUNTED THEREON AND FAILURE DETECTION METHOD

CLAIM OF PRIORITY

The present application claims priority from Japanese patent application JP 2011-268263 filed on Dec. 7, 2011, the content of which is hereby incorporated by reference into this application.

BACKGROUND

This invention relates to a virtual computer system having an I/O device compliant with SR-IOV mounted thereon, for providing a virtual computer.

In the current Internet society, provision of services using computer systems running 24 hours and 365 days is prevailing. Therefore, if a failure occurs on a computer, it is required to recover from the failure as early as possible, thereby resuming the service provision.

If a failure occurs on a computer, a maintenance person investigates a cause of the failure. If the cause of the failure is a failure of a component, it is necessary to replace the failed component by a normal component, and to restart the computer. In order to decrease the time until the recovery from the failure, it is necessary to quickly identify a location of the failed component.

In recent years, a virtual computer in which hardware is virtualized and a plurality of OSs are operated on the virtual hardware has become common, and there is a technology for detecting a failure of a physical I/O device (see, for example, Japanese Patent Application Laid-open No. 2009-301162 and BladeSymphony "Hardware maintenance agent configuration guide" For BS2000, Hitachi, Ltd., September 2010, p. 10).

On the other hand, as a technology for solving a low I/O performance of the virtual computer, Single Root I/O Virtualization (SR-IOV) for using one I/O device by a plurality of virtual computers is proposed (see, for example, Intel (trademark) 82599 SR-IOV Driver Companion Guide, Intel, May 2010, Page 8). According to the SR-IOV, one I/O device includes a physical function (PF) assigned to one physical computer and a plurality of virtual functions (VFs) assigned to a plurality of virtual computers. A virtualization module (such as virtual machine monitor (VMM)) executed on a host OS on a physical computer can provide a virtual computer with a VF as a virtual device, and a guest OS on each of the virtual computers uses a VF driver, thereby making access to the VF, and using the I/O device.

SUMMARY

Conventionally, a computer system providing a virtual computer can detect a failure in a physical I/O device. In this case, a driver controlling the physical I/O device is functioning on a host OS, and this driver detects a failure of the physical I/O device, and records the failure information in an OS log of the host OS. A failure detection program is operating on the host OS, and detects failure information on the physical I/O device from the failure information in the OS log.

On the other hand, a VF driver controlling a VF of an I/O device compliant with the SR-IOV is functioning on a guest OS of a virtual computer, detects a failure in a virtual I/O device, and records failure information in an OS log of the guest OS. If the failure detection program is executed on the guest OS, the failure information on the virtual I/O device can be detected from the failure information in the OS log, but to which physical I/O device the occurrence of the failure corresponds cannot be detected. Particularly, if a plurality of ports are provided for an I/O device compliant with the SR-IOV, there is a problem in that the physical computer and the port or the VF on which the failure has occurred cannot be recognized quickly.

This invention has an object to quickly identify a physical I/O device on which a failure has occurred on a virtual computer system having an I/O device compliant with SR-IOV mounted thereon, thereby enabling a quick replacement of the I/O device.

To solve the problems, a virtual computer system, comprising: a physical computer including a processor, a memory, at least one slot, and an I/O device mounted in the at least one slot; and a host including a virtualization module for assigning a computer resource of the physical computer to at least one virtual computer, wherein: the I/O device includes a physical function and a virtual function, and is compliant with an SR-IOV; the physical computer uses the physical function of the I/O device via a PF driver of the host for using the physical function, and the at least one virtual computer uses the virtual function of the I/O device via a VF driver for using the virtual function; the at least one virtual computer includes: device information for retaining a virtual device name of the I/O device assigned to the at least one virtual computer and VF specific information on the I/O device on the memory; and a failure detection module for guest for detecting occurrence of a failure in the virtual function, and notifying the host of the occurrence of the failure; the host includes: I/O correspondence information for retaining a slot number of a slot in which the I/O device is mounted, and the VF specific information on the memory; and a failure detection module for host for identifying the slot number of the I/O device on which a failure has occurred; when the failure detection module for guest detects the failure of the virtual function, the failure detection module for guest refers to the device information containing the virtual device name and the VF specific information, thereby acquiring the virtual device name of the virtual device providing the virtual function on which the failure has occurred, refers to the device information by the virtual device name, thereby acquiring the VF specific information corresponding to the acquired virtual device name, and transmits the acquired VF specific information to the failure detection module for host; and when the failure detection module for host receives the VF specific information from the failure detection module for guest, the failure detection module for host refers to the I/O correspondence information, thereby identifying the slot number corresponding to the received VF specific information.

Therefore, this invention can identify, in the virtual computer system having the I/O device compliant with the SR-IOV mounted thereon, the physical I/O device on which the failure has occurred, thereby enabling a quick replacement of the I/O device.

BRIEF DESCRIPTION OF THE DRAWINGS

FIG. 3 illustrates an example of the device information held by the virtual computer.

FIG. 4 illustrates an example of the I/O correspondence information held by the host OS7.

DETAILED DESCRIPTION OF THE PREFERRED EMBODIMENTS

A description is now given of embodiments of this invention referring to the accompanying drawings.

Figure 1:
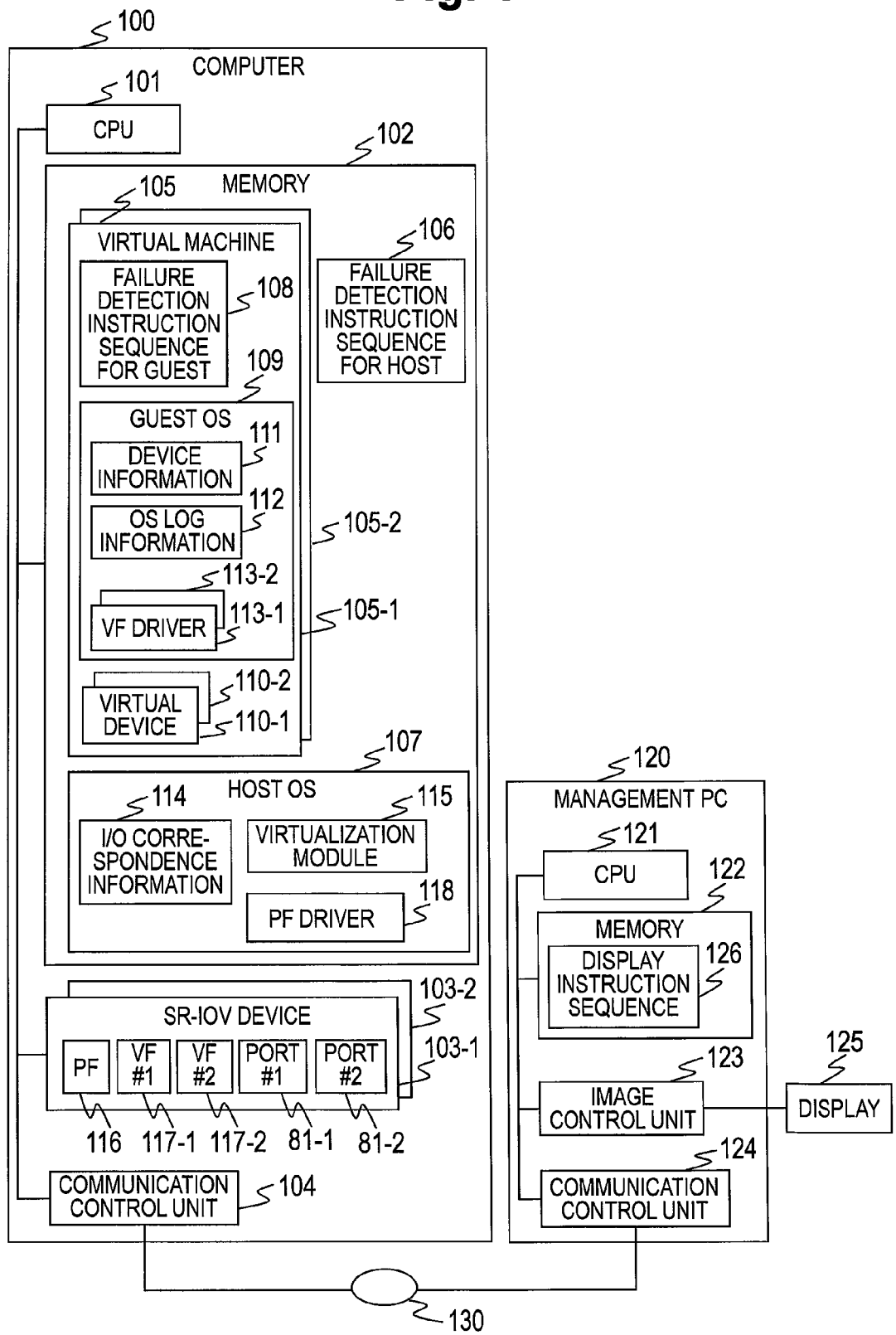
FIG. 1 illustrates a first embodiment of this invention, and is a block diagram illustrating an example of a virtual computer system to which this invention is applied.

FIG. 1 illustrates a first embodiment of this invention, and is a block diagram illustrating an example of a virtual computer system to which this invention is applied.

In FIG. 1, a computer 100 includes a CPU 101, a memory 102, one or a plurality of SR-IOV devices 103-1 and 103-2, and a communication control unit 104, and the respective components from the CPU 101 to the communication control unit 104 are coupled to each other. The SR-IOV devices 103-1 and 103-2 are generally denoted by reference numeral 103.

The memory 102 stores one or a plurality of virtual machines 105-1 and 105-2, a failure detection instruction sequence for host 106, and a host OS 107. The virtual machines 105-1 and 105-2 are generally denoted by reference numeral 105.

The host OS 107 includes a virtualization module 115 for virtualizing resources of the computer 100, and assigning the virtualized resources to the virtual machines 105, and a PF driver 118 for making access to physical functions (hereinafter referred to as PFs) 116, which are physical functions of the SR-IOV devices 103. Moreover, the host OS 107 includes I/O correspondence information 114 used by the failure detection instruction sequence for host 106.

The failure detection instruction sequence for host 106 is an instruction sequence (program) having a function of collecting and analyzing failure information on the computer 100, and notifying, via a network 130, the outside of the computer 100 of information for identifying locations of the SR-IOV devices (I/O devices) 103-1 and 103-2 on which a failure occurs.

The virtual machines 105-1 and 105-2 each include a failure detection instruction sequence for guest 108, a guest OS 109, and one or a plurality of virtual devices 110-1 and 110-2. The virtual devices 110-1 and 110-2 are generally denoted by reference numeral 110. It should be noted that the virtual device 110 is a device provided by the virtualization module 115 of the host OS 107, and, according to this embodiment, an I/O device compliant with the virtual function (hereinafter referred to as VF), which is a virtual function of the SR-IOV device 103, is provided as the virtual device.

The failure detection instruction sequence for guest 108 is an instruction sequence having a function of collecting and analyzing failure information on the virtual machine 105, and notifying the failure detection instruction sequence for host 106 of information for identifying a virtual device on which a failure has occurred.

The guest OS 109 includes device information 111, OS log information 112, and one or a plurality of virtual function drivers (hereinafter, referred to as VF drivers) 113-1 and 113-2. The guest OS 109 executes an application or a service (not shown). The VF drivers 113-1 and 113-2 are generally denoted by reference numeral 113. Moreover, in the illustrated example, two VF drivers 113 are illustrated, but the number of VF drivers 113 depends on the number of virtual devices 110 assigned to the virtual machine 105.

The computer 100 includes a plurality of slots, and one or more SR-IOV devices 103-1 and 103-2 are mounted therein. The SR-IOV device 103 includes a PF 116 and one or a plurality of VFs 117-1 and 117-2. The VFs 117-1 (VF #1) and 117-2 (VF #2) are generally denoted by reference numeral 117.

The PF 116 serves to receive an instruction such as a virtual device setting from the PF driver 118, to provide a virtual machine with a virtual device, and to provide the PF driver 118 with physical information on the SR-IOV device 103, for example.

The VF 117 serves to receive a control instruction from the VF driver 113, to enable the virtual machine 105 to directly control, without intervention of the host OS 107, the SR-IOV device 103, and to provide the VF driver 113 with information on the SR-IOV device 103, for example. The SR-IOV device 103-1 includes two ports (#1) 81-1 and (#2) 81-2. The ports 81-1 and 81-2 are generally denoted by reference numeral 81.

A management PC 120 includes a CPU 121, a memory 122, an image control unit 123, and a communication control unit 124, and the respective components from the CPU 121 to the communication control unit 124 are coupled to each other.

The memory 122 stores a display instruction sequence 126. The image control unit 123 is coupled to a display 125. The communication control unit 104 of the computer 100 and the communication control unit 124 of the management PC 120 are coupled to each other via the network 130.

The display instruction sequence 126 is an instruction sequence for receiving, from the failure detection instruction sequence for host 106, information for identifying a location of the SR-IOV device 103 on which a failure has occurred, and displaying the received information on the display 125.

The functional components, which include the failure detection instruction sequence for guest 108 and the failure detection instruction sequence for host 106, are loaded on the memory 102 as programs.

The CPU 101 operates in accordance with a program of each of the functional components, thereby operating as a functional unit for realizing a predetermined function. For example, the CPU 101 operates in accordance with the failure detection instruction sequence for host 106, thereby functioning as a host failure detection module. The same holds true for the other programs. Further, the CPU 101 also operates as a functional unit for realizing a plurality of respective pieces of processing carried out by each of the programs.

Information such as programs and tables for realizing each of the functions can be stored in memory devices such as a storage system, a non-volatile semiconductor memory, a hard disk drive, and a solid state drive (SSD), which are not shown, and a computer readable non-transitory data storage medium such as an IC card, an SD card, and a DVD.

Figure 2:
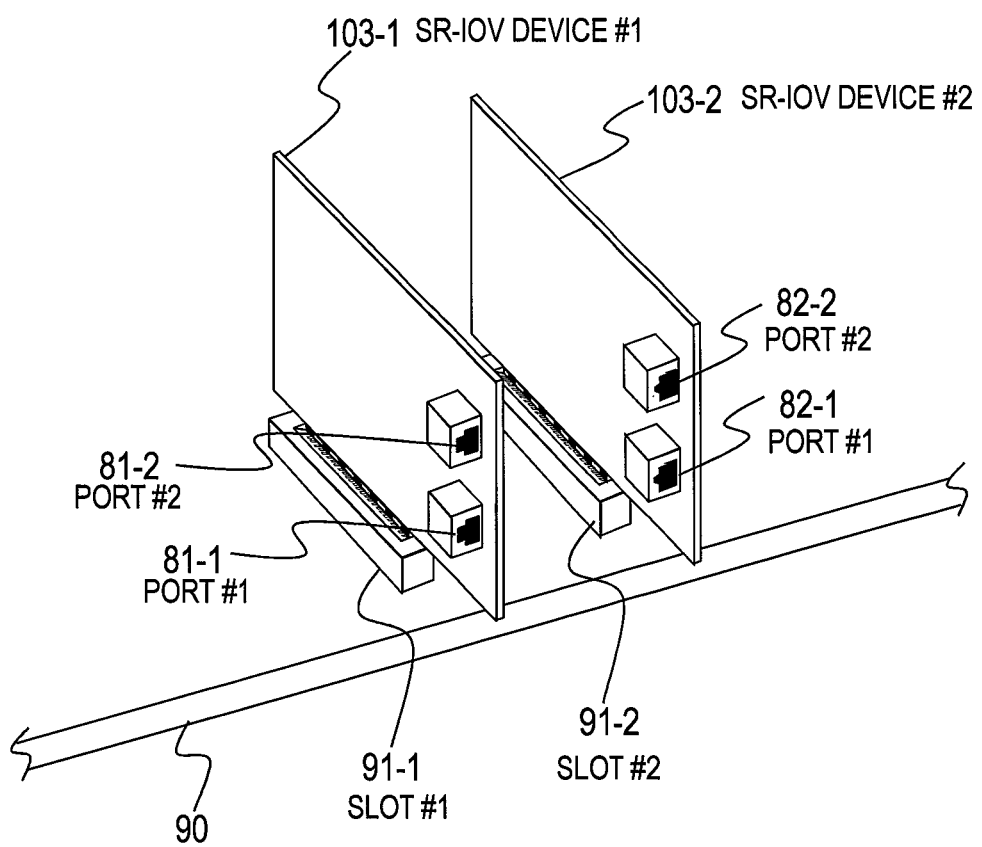
FIG. 2 is a perspective view illustrating an example of slots in which the SR-IOV devices are to be mounted.

FIG. 2 is a perspective view illustrating an example of slots in which the SR-IOV devices 103 are to be mounted. The computer 100 includes one or more slots 91-1 and 91-2 for mounting SR-IOV devices 103 on a system board 90 carrying the CPU 101 and the memory 102. The slots 91-1 and 91-2 are generally denoted by reference numeral 91. The illustrated example is an example in which two slots 91 are provided on the system board 90. The slot 91 is compliant with, for example, the PCI Express.

In the slot (#1) 91-1, the SR-IOV device #1 (103-1) is mounted, and, in the slot (#2) 91-2, the SR-IOV device #2 (103-2) is mounted. The SR-IOV/device #1 (103-1) includes two ports (#1) 81-1 and (#2) 81-2. The SR-IOV device #2 (103-2) includes two ports (#1) 82-1 and (#2) 82-2. The SR-IOV device #1 (103-1) is, for example, a network interface card, and the SR-IOV device #2 (103-1) is, for example, a host bus adapter (HBA).

The ports 81-1 and 81-2 are generally denoted by reference numeral 81, and the ports 82-1 and 82-2 are generally denoted by reference numeral 82.

FIG. 3 illustrates an example of the device information 111 held by the virtual computer. The device information 111 stores, for each of the virtual devices 110 included in the virtual machine 105, a line number 1111, a virtual device name 1112, and VF specific information 1113. Examples of the VF specific information include a MAC address of a communication port and a world wide name (WWN) of the Fibre Channel port.

As described later, an example in which the device information 111 is generated by the failure detection instruction sequence for guest 108 using the VF driver 113 is described, but the device information 111 may be generated by the guest OS 109 using the VF driver 113.

FIG. 4 illustrates an example of the I/O correspondence information 114 held by the host OS 107. The I/O correspondence information 114 stores, for SR-IOV devices 103 included in the computer 100, line numbers 1141, slot numbers 1142 installed on the system board 90, SR-IOV device names 1143, VF names 1144, VF specific information 1145, and port numbers 1146.

The slot number 1142 is a number corresponding to a location of the slot 91 in which the SR-IOV device 103 is mounted. The SR-IOV device name 1143 corresponds to a type of the SR-IOV device 103. The VF name 1144 corresponds to a port number (#1, #2) of the SR-IOV device 103. The VF specific information 1145 is common information which can be acquired from both the host OS 107 and the guest OS 109, and, as described above, is constituted by a MAC address of a communication port or a WWN of a Fibre Channel port, for example.

By combining the device information 111 and the I/O correspondence information 114, if the VF specific information 1113 acquired on the guest OS 109 can be transmitted to the host OS 107, by referring to the I/O correspondence information 114 on the host OS 107, thereby searching for the VF specific information 1145, the slot number 1142 of the SR-IOV device 103, the type (device name) 1143 of the SR-IOV device 103, and the port number 1146 of the SR-IOV device 103 can be uniquely identified.

The above-mentioned I/O correspondence information 114 is generated, after the host OS 107 starts, from information acquired from the SR-IOV devices 103.

Figure 5:
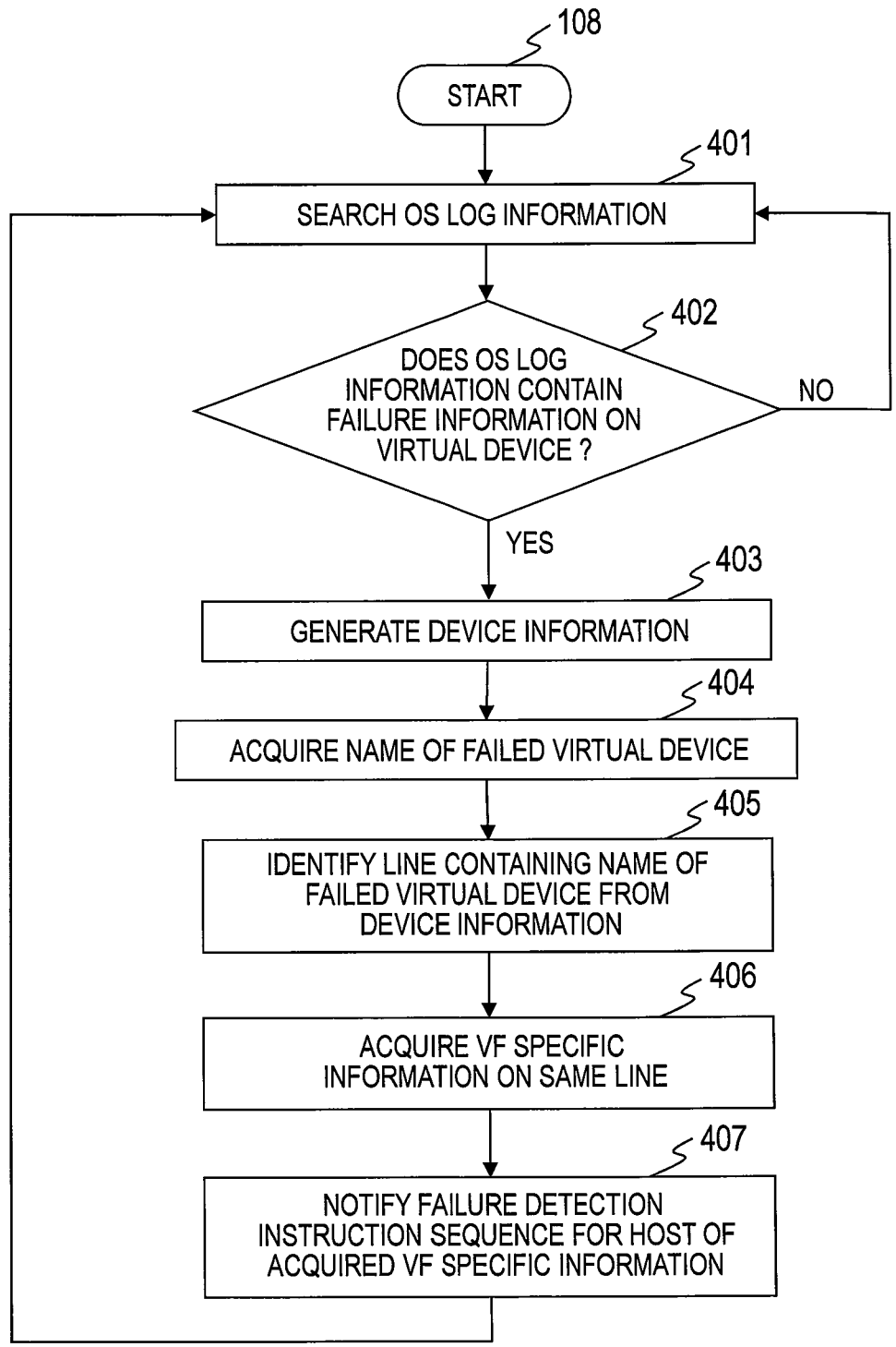
FIG. 5 is a flowchart illustrating an example of processing by the failure detection instruction sequence for guest executed by the guest OS.

FIG. 5 is a flowchart illustrating an example of processing by the failure detection instruction sequence for guest 108 executed by the guest OS 109. The failure detection instruction sequence for guest 108 is executed by the CPU 101 via the guest OS 109 of the virtual machine 105.

In Step 401, the failure detection instruction sequence for guest 108 searches the OS log information 112.

In Step 402, the failure detection instruction sequence for guest 108 determines whether or not failure information on a virtual device exists in the OS log information 112, and when failure information does not exist, the failure detection instruction sequence for guest 108 proceeds to Step 401, and when failure information exists, the failure detection instruction sequence for guest 108 proceeds to Step 403.

In Step 403, the failure detection instruction sequence for guest 108, acquires, by using the VF driver 113, the virtual device name 1112 and the VF specific information 1113 of a virtual device 110, thereby generating the device information 111. The VF driver 113 can acquire, from the VF 117, virtual information on the SR-IOV device 103. The virtual information is information provided by the SR-IOV device 103 for the virtual machine 105 as the virtual device 110, and includes a virtual device name and VF specific information. However, the virtual information does not include an SR-IOV device name and a VF name, which are pieces of physical information on the SR-IOV device 103. In other words, the VF driver 113 can acquire the virtual device name and the VF specific information, but cannot acquire the SR-IOV device name and the VF name.

In Step 404, the failure detection instruction sequence for guest 108 acquires a virtual device name 1112 of the virtual device 110 on which the failure has occurred. The virtual device name 1112 of the virtual device 110 on which the failure has occurred is a value which can be acquired from the OS log information 112 acquired in Step 402.

In Step 405, the failure detection instruction sequence for guest 108 identifies, from the device information 111, a line containing the virtual device name 1112 of the virtual device 110 on which the failure has occurred.

In Step 406, the failure detection instruction sequence for guest 108 acquires the VF specific information 1113 found on the line identified in Step 405.

In Step 407, the failure detection instruction sequence for guest 108 notifies the failure detection instruction sequence for host 106 of the VF specific information 1113 acquired in Step 406, and proceeds to Step 401.

As a result of the above-mentioned processing, in the virtual machine 105, when a failure occurs on the SR-IOV device 103, the failure detection instruction sequence for guest 108 functioning as an agent for failure detection notifies the failure detection instruction sequence for host 106 of the VF specific information 1113 on the virtual device 110 on which the failure has occurred.

Figure 6:
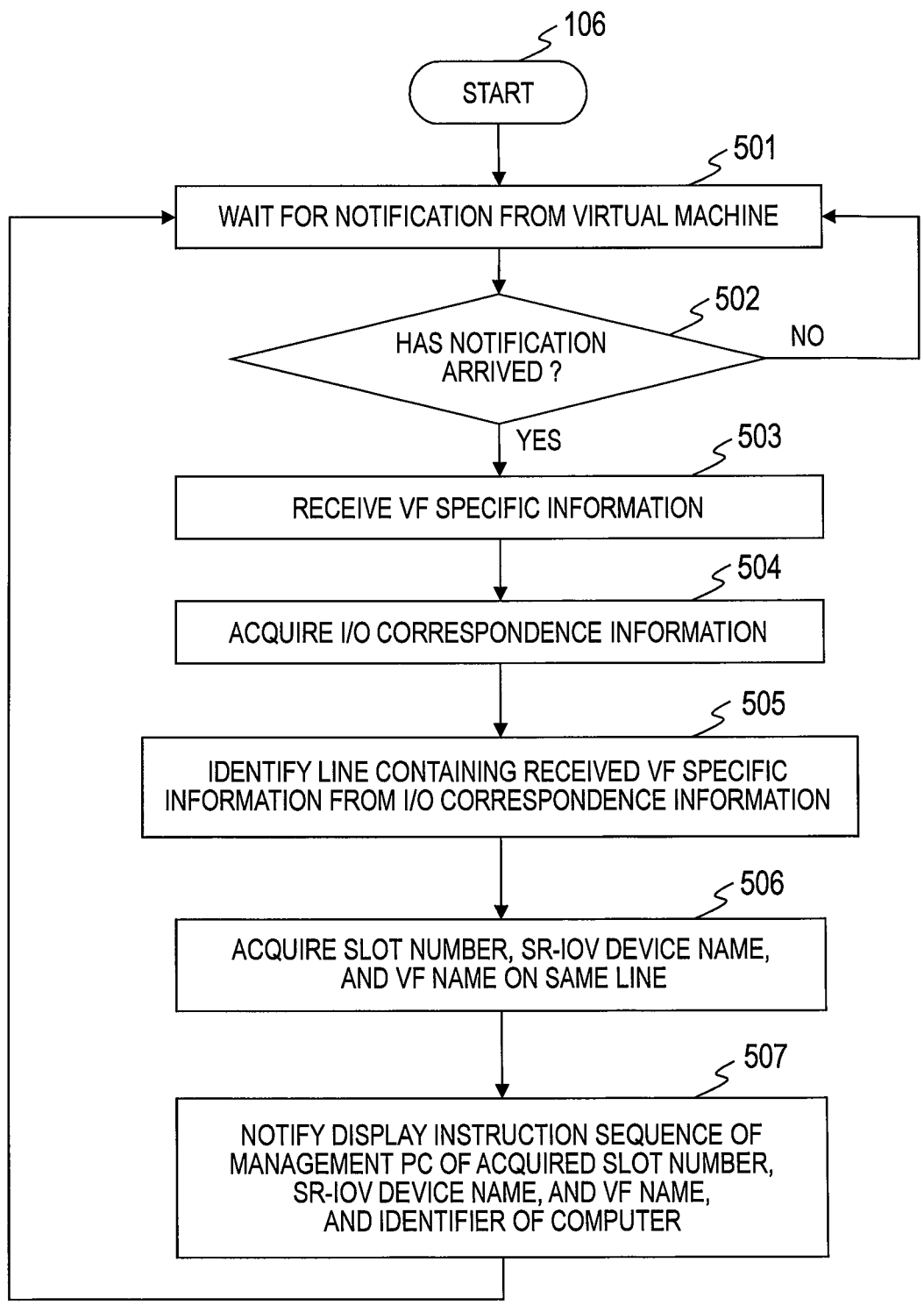
FIG. 6 is a flowchart illustrating an example of processing by the failure detection instruction sequence for host 106 executed by the host OS.

FIG. 6 is a flowchart illustrating an example of processing by the failure detection instruction sequence for host 106 executed by the host OS 107. The failure detection instruction sequence for host 106 is executed by the CPU 101 via the host OS 107.

In Step 501, the failure detection instruction sequence for host 106 waits for a notification from a virtual machine 105.

In Step 502, the failure detection instruction sequence for host 106 determines whether or not a notification has arrived, and when a notification has not arrived, the failure detection instruction sequence for host 106 returns to Step 501, and when a notification has arrived, the failure detection instruction sequence for host 106 proceeds to Step 503.

In Step 503, the failure detection instruction sequence for host 106 receives the VF specific information on a virtual device 110 on which a failure has occurred from a virtual machine 105.

In Step 504, the failure detection instruction sequence for host 106 acquires the I/O correspondence information 114 held by the host OS 107.

In Step 505, the failure detection instruction sequence for host 106 searches the I/O correspondence information 114, thereby identifying a line containing the VF specific information received from the virtual machine 105.

In Step 506, the failure detection instruction sequence for host 106 acquires a slot number 1142, an SR-IOV device name 1142, and a VF name 1144 found on the line identified in Step 505.

In Step 507, the failure detection instruction sequence for host 106 notifies the display instruction sequence 126 of the management PC 120 of the slot number, the SR-IOV device name, and the VF name acquired in Step 506, and an identifier of the computer 100, and proceeds to Step 501.

The failure detection instruction sequence for guest 108 can acquire occurrence of the failure on the SR-IOV device 103, and VF specific information 1113 thereon. When the VF specific information is determined, the failure detection instruction sequence for host 106 can uniquely identify a slot number 1142 of the SR-IOV device 103, a type (name) 1113 of the SR-IOV device 103, and a VF name 1144 of the SR-IOV device 103. Thus, by notifying, by the failure detection instruction sequence for guest 108, when a failure occurs on the SR-IOV device 103, the failure detection instruction sequence for host 106 of the VF specific information, the failure detection instruction sequence for host 106 can identify, by referring to the I/O correspondence information 114, a line containing the notified VF specific information. As a result, in the virtual computer system according to this embodiment on which the I/O devices compliant with the SR-IOV are mounted, a slot number of an SR-IOV device 103 on which a failure has occurred, and a type and a VF name 1144 of the SR-IOV device 103 can be uniquely identified.

Figure 7:
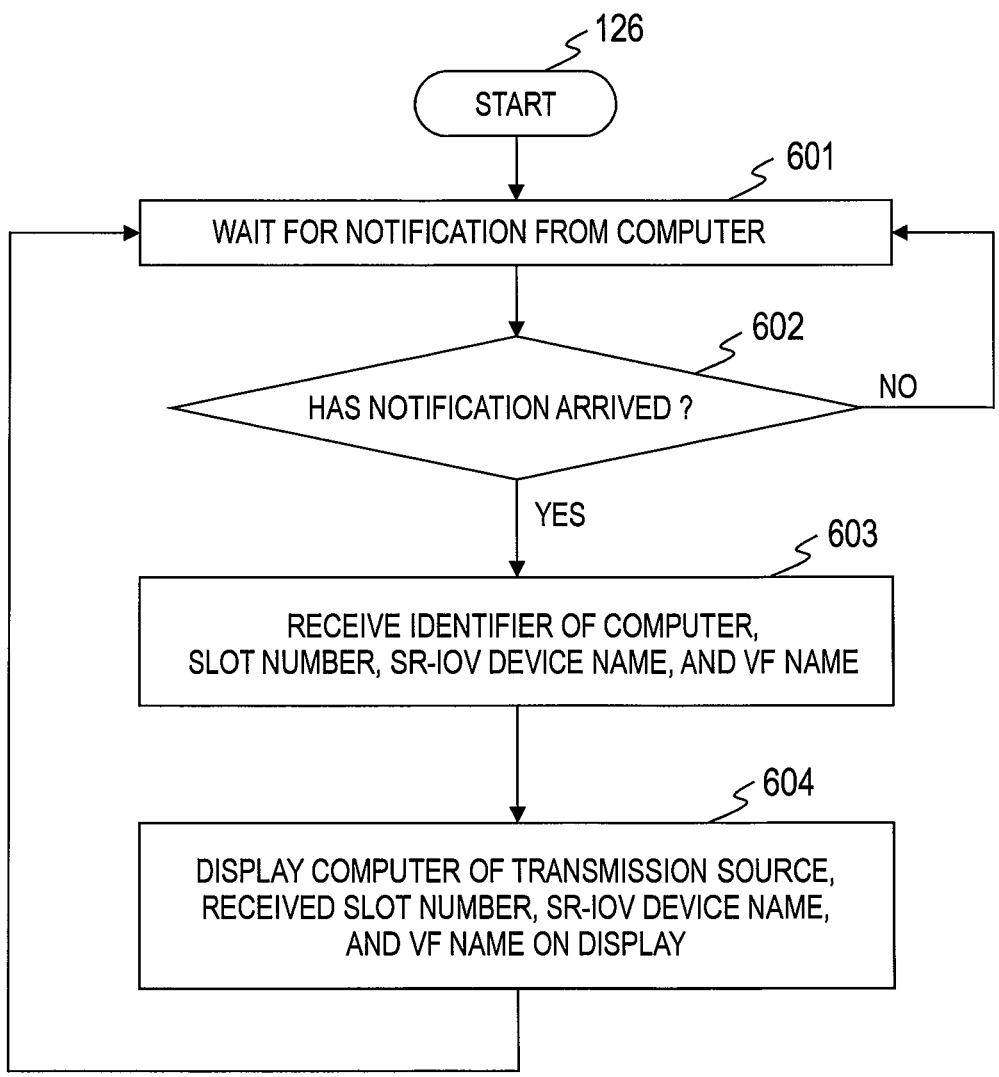
FIG. 7 is a flowchart illustrating an example of processing by the display instruction sequence executed by the management PC.

FIG. 7 is a flowchart illustrating an example of processing by the display instruction sequence 126 executed by the management PC 120. The display instruction sequence 126 is executed, via an OS 109 (not shown) of the management PC 120, by the CPU 121.

In Step 601, the display instruction sequence 126 waits for a notification from the computer 100.

In Step 602, the display instruction sequence 126 determines whether or not a notification has arrived from the computer 100, and when a notification has not arrived, the display instruction sequence 126 returns to Step 601, and when a notification has arrived, the display instruction sequence 126 proceeds to Step 603.

In Step 603, the display instruction sequence 126 receives the identifier of the computer 100, the slot number, the SR-IOV device name, and the VF name from the computer 100.

In Step 604, the display instruction sequence 126 displays the identifier of the computer 100 of the transmission source, the slot number, the SR-IOV device name, and the VF name received in Step 603 on the display 125 via the image control unit 123, and proceeds to Step 601.

By applying this invention, in the virtual computer system on which the I/O devices compliant with the SR-IOV are mounted, based on the OS log information 112 and the device information 111 of the virtual machine 105, and the I/O correspondence information 114 of the host OS 107, the display instruction sequence 126 of the management PC 120 can display the identifier of a computer 100 on which a failure has occurred, a slot number of a slot 91 in which an SR-IOV device 103 is mounted, a type of the SR-IOV device 103, and a VF name of the SR-IOV device 103 on the display 125.

In the above-mentioned conventional example, only the computer on which a failure has occurred is identified, and hence after a maintenance person arrives on the computer, the maintenance person needs to find an SR-IOV device on which the failure has occurred, and then replace the SR-IOV device 103. In contrast, according to this invention, after the maintenance person arrives on the computer, the maintenance person does not need to find an SR-IOV device 103 on which the failure has occurred, and the management PC 120 has recognized the computer and the slot number. Therefore, the SR-IOV device 103 on which the failure has occurred can be replaced immediately, and the I/O card can be replaced more quickly than in the conventional case.

In the above-mentioned embodiment, the example in which the identifier of the computer 100, the slot number of the slot 91 in which the SR-IOV is mounted, the type of the SR-IOV, and the VF name of the SR-IOV device 103 are displayed on the display 125 is described, but when a maintenance person replaces a failed SR-IOV device 103 with a normal device, it is only necessary to display the identifier of the computer 100 and the slot number of the slot 91 in which the SR-IOV device 103 is mounted.

In a case where there are a plurality of enclosures storing a large number of computers 100, an identifier of the enclosure may be added to an identifier of the computer 100.

Second Embodiment

Figure 8:
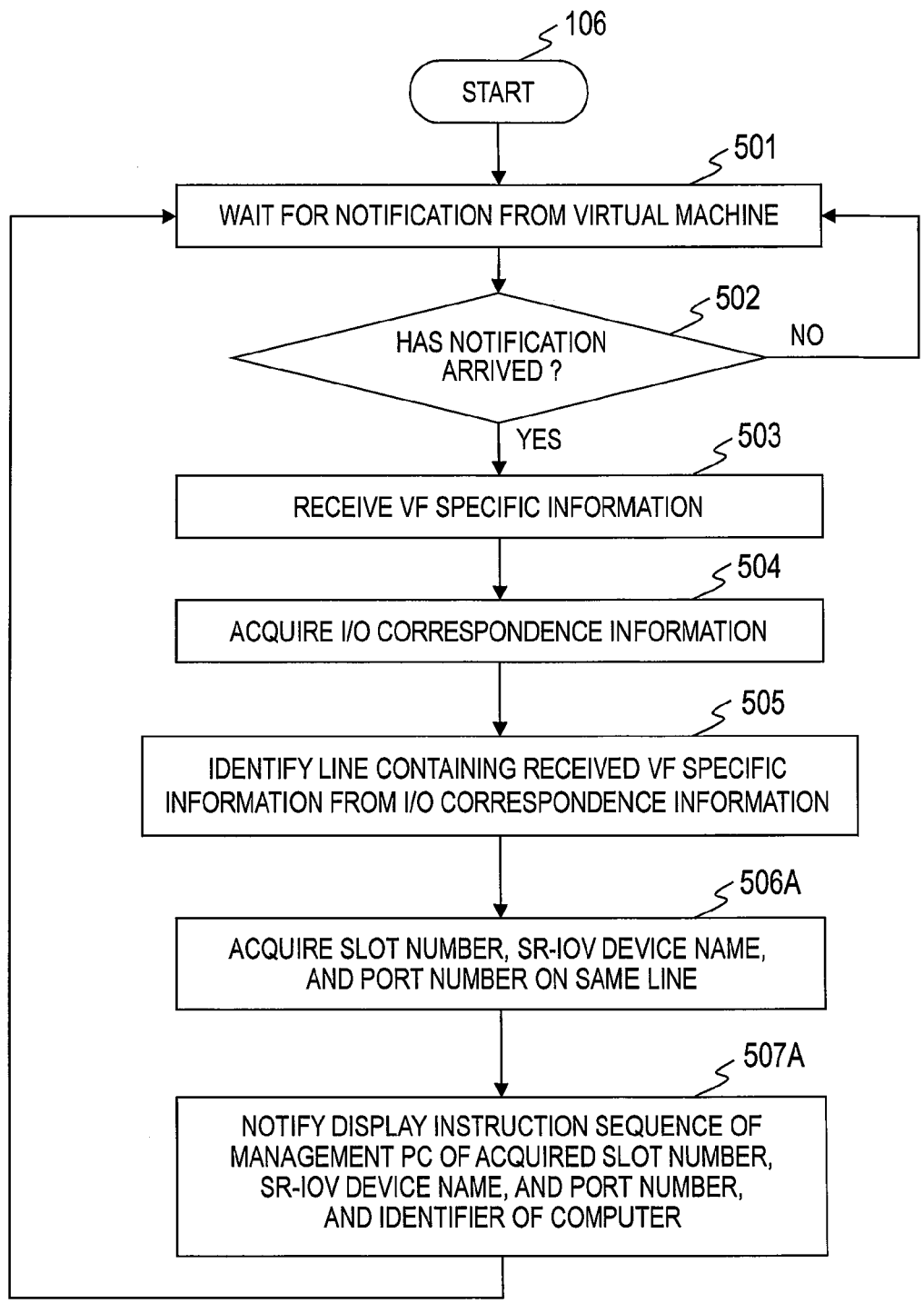
FIG. 8 illustrates the second embodiment, and is a flowchart illustrating an example of processing by the failure detection instruction sequence for host executed on the host OS.
Figure 9:
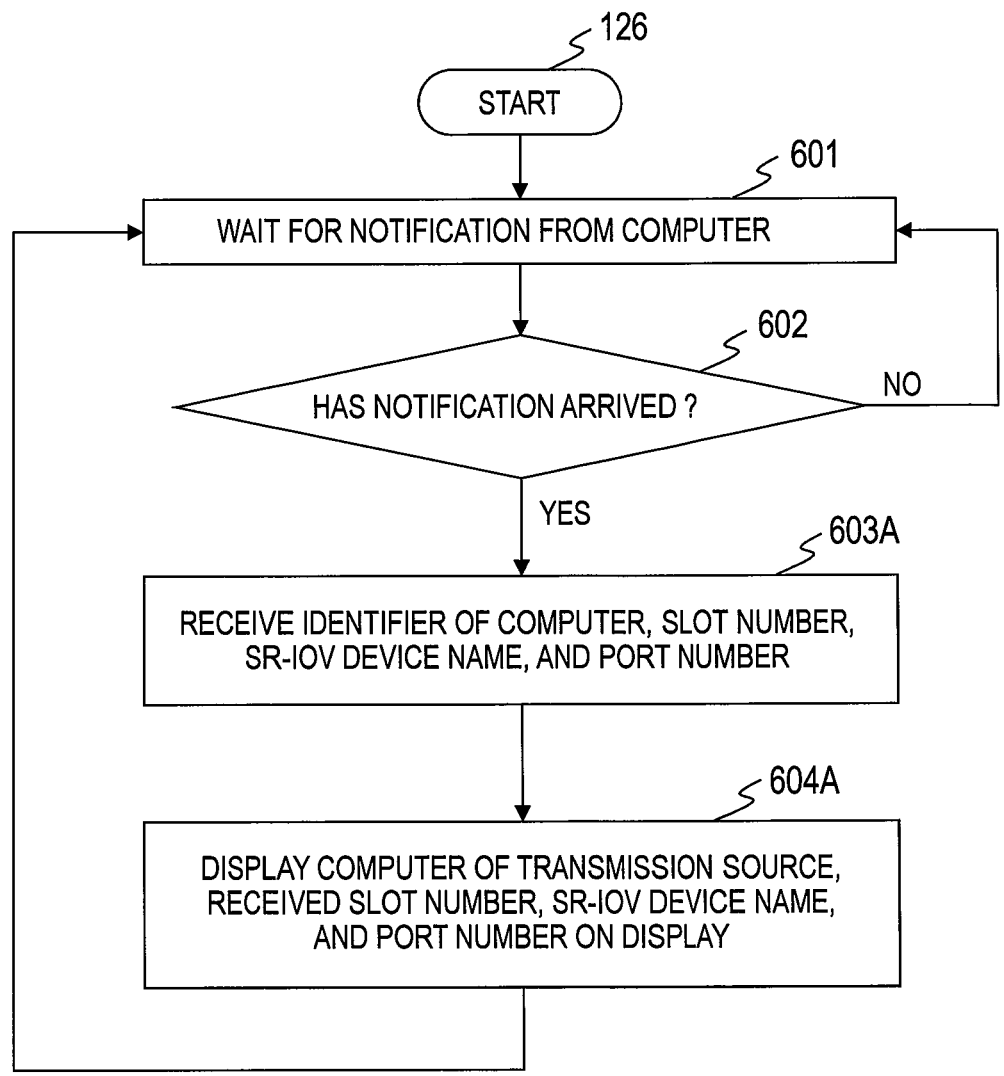
FIG. 9 illustrates the second embodiment, and is a flowchart illustrating an example of processing by the display instruction sequence executed on the management PC.

FIGS. 8 and 9 illustrate a second embodiment of this invention. In the first embodiment, the example in which, on the display 125 of the management PC 120, a slot number, an SR-IOV device name, and a VF name of a failed SR-IOV device 103 are displayed is described. According to the second embodiment, an example in which, in place of the VF name, a port number is displayed is described.

FIG. 8 illustrates the second embodiment, and is a flowchart illustrating an example of processing by the failure detection instruction sequence for host 106 executed on the host OS 107. Steps 501 to 505 are the same as those in the first embodiment described above.

In Step 506A, the failure detection instruction sequence for host 106 acquires a slot number 1142, an SR-IOV device name 1142, and a port number 1146 found on the line identified in Step 505.

In Step 507A, the failure detection instruction sequence for host 106 notifies the display instruction sequence 126 of the management PC 120 of the slot number, the SR-IOV device name, and the port number acquired in Step 506, and an identifier of the computer 100, and proceeds to Step 501.

The failure detection instruction sequence for guest 108 can acquire the occurrence of the failure on the SR-IOV device 103, and the VF specific information 1113 thereon. When the VF specific information is determined, the failure detection instruction sequence for host 106 can uniquely identify a slot number 1142 of the SR-IOV device 103, a type (name) 1113 of the SR-IOV device 103, and a port number 1146 of the SR-IOV device 103.

FIG. 9 illustrates the second embodiment, and is a flowchart illustrating an example of processing by the display instruction sequence 126 executed on the management PC 120. Steps 601 to 602 are the same as those in the first embodiment described above.

In Step 603A, the display instruction sequence 126 receives the identifier of the computer 100, the slot number, the SR-IOV device name, and the port number from the computer 100.

In Step 604A, the display instruction sequence 126 displays the identifier of the computer 100 of the transmission source, the slot number, the SR-IOV device name, and the port number received in Step 603A on the display 125 via the image control unit 123, and proceeds to Step 601.

By applying this invention, in the virtual computer system on which the I/O devices compliant with the SR-IOV are mounted, based on the OS log information 112 and the device information 111 of the virtual machine 105, and the I/O correspondence information 114 of the host OS 107, the display instruction sequence 126 of the management PC 120 can display the identifier of a computer 100 on which a failure has occurred, a slot number of a slot 91 in which an SR-IOV device 103 is mounted, the type of the SR-IOV device 103, and a port number of the SR-IOV device 103.

As in the first embodiment, after the maintenance person arrives on the computer, the maintenance person does not need to find an SR-IOV device 103 on which the failure has occurred, and the management PC 120 has recognized the computer and the slot number. Therefore, the SR-IOV device 103 on which the failure has occurred can be replaced immediately, and the I/O card can be replaced more quickly than in the conventional case.

According to the second embodiment, the maintenance person can recognize a port number of a failed port, thus can identify a device and a network coupled to a port having the port number, and can estimate an extent of influence of the failure.

Figure 10:
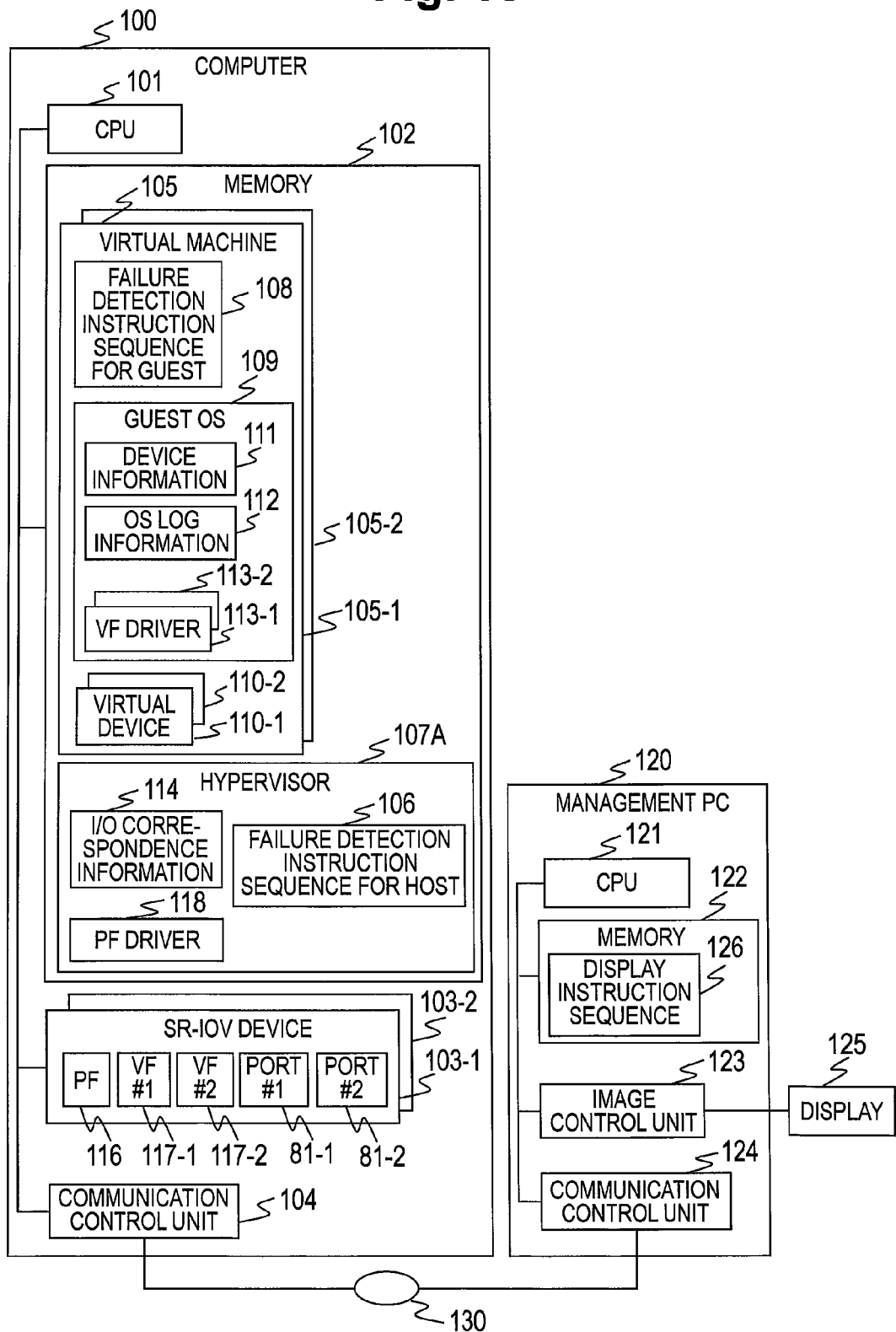
FIG. 10 illustrates an alternative embodiment of this invention, and is a block diagram illustrating an example of a virtual computer system.

According to the first and second embodiments, the example in which the virtual machine 105 is generated by providing the host OS 107 with the virtualization module 115 is described, but in place of the host OS 107, a hypervisor may manage the virtual machine 105. In this case, in place of the host OS 107 illustrated in FIG. 1, as illustrated in FIG. 10, on a hypervisor 107A, a virtual machine 105 may be provided. In other words, the hypervisor 107A functions as a host including a virtualization module for virtualizing the computer resources of the physical computer 100, thereby assigning the virtual machine 105 with the virtualized resources.

In this case, the hypervisor 107A includes the I/O correspondence information 114, the PF driver 118, and the failure detection instruction sequence for host 106, and when a failure occurs on the VF 117, the failure detection instruction sequence for guest 108 makes the above-mentioned notification to the failure detection instruction sequence for host 106 of the hypervisor 107A. Then, the failure detection instruction sequence for host 106 of the hypervisor 107A may notify the management PC 120 of the identifier of the computer and the slot number.

According to the first and second embodiments, the example in which a failure of the virtual device 110 (SR-IOV device 103) is detected from the OS log information 112 is described, but regarding the failure detection, publicly-known or well-known technologies such as that described in Japanese Patent Application Laid-open No. 2009-301162 may be properly used.

While the present invention has been described in detail and pictorially in the accompanying drawings, the present invention is not limited to such detail but covers various obvious modifications and equivalent arrangements, which fall within the purview of the appended claims.

What is claimed is:

1. A virtual computer system, comprising:
a physical computer including a processor, a memory, at least one slot, and an I/O device mounted in the at least one slot; and
a host including a virtualization module for assigning a computer resource of the physical computer to at least one virtual computer, wherein:
the I/O device includes a physical function and a virtual function, and is compliant with an SR-IOV;
the physical computer uses the physical function of the I/O device via a PF driver of the host for using the physical function, and the at least one virtual computer uses the virtual function of the I/O device via a VF driver for using the virtual function;
the at least one virtual computer includes:
device information for retaining a virtual device name of the I/O device assigned to the at least one virtual computer and VF specific information on the I/O device on the memory; and
a failure detection module for guest for detecting occurrence of a failure in the virtual function, and notifying the host of the occurrence of the failure;
the host includes:
I/O correspondence information for retaining a slot number of a slot in which the I/O device is mounted, and the VF specific information on the memory; and
a failure detection module for host for identifying the slot number of the I/O device on which a failure has occurred;
when the failure detection module for guest detects the failure of the virtual function, the failure detection module for guest refers to the device information containing the virtual device name and the VF specific information, thereby acquiring the virtual device name of the virtual device providing the virtual function on which the failure has occurred, refers to the device information by the virtual device name, thereby acquiring the VF specific information corresponding to the acquired virtual device name, and transmits the acquired VF specific information to the failure detection module for host; and
when the failure detection module for host receives the VF specific information from the failure detection module for guest, the failure detection module for host refers to the I/O correspondence information, thereby identifying the slot number corresponding to the received VF specific information.

2. The virtual computer system according to claim 1, wherein:
the I/O correspondence information contains, in addition to the slot number of the slot in which the I/O device is mounted and the VF specific information, a device name of the I/O device, and a VF name of the virtual function; and
when the failure detection module for host receives the VF specific information from the failure detection module for guest, the failure detection module for host refers to the I/O correspondence information, thereby identifying, in addition to the slot number corresponding to the received VF specific information, the device name of the I/O device and the VF name of the virtual function.

3. The virtual computer system according to claim 1, wherein the device information uniquely associates the virtual device name and the VF specific information with each other.

4. The virtual computer system according to claim 1, wherein:
the I/O correspondence information contains, in addition to the slot number of the slot in which the I/O device is mounted and the VF specific information, a device name of the I/O device, and a port number corresponding to the virtual function; and when the failure detection module for host receives the VF specific information from the failure detection module for guest, the failure detection module for host refers to the I/O correspondence information, thereby identifying, in addition to the slot number corresponding to the received VF specific information, the device name of the I/O device and the port number.

5. The virtual computer system according to claim 1, wherein:
the I/O correspondence information contains, in addition to the slot number of the slot in which the I/O device is mounted and the VF specific information, a device name of the I/O device, a VF name of the virtual function, and a port number corresponding to the VF name; and
when the failure detection module for host receives the VF specific information from the failure detection module for guest, the failure detection module for host refers to the I/O correspondence information, thereby transmitting, in addition to the slot number corresponding to the received VF specific information, the device name of the I/O device and one of the VF name and the port number.

6. The virtual computer system according to claim 1, wherein the host further includes a host OS and a virtualization module operated by the host OS.

7. The virtual computer system according to claim 1, wherein, when the failure detection module for host receives the VF specific information from the failure detection module for guest, the failure detection module for host refers to the I/O correspondence information, thereby transmitting, in addition to the slot number corresponding to the received VF specific information, an identifier of the physical computer.

8. A failure detection method for an SR-IOV compliant device, for use in a virtual computer system, the virtual computer system comprising a physical computer including a processor, a memory, at least one slot, and an I/O device mounted in the at least one slot, and a host including a virtualization module for assigning a computer resource of the physical computer to at least one virtual computer, the I/O device including a physical function and a virtual function and being compliant with an SR-IOV, the physical computer using the physical function of the I/O device via a PF driver of the host, the at least one virtual computer using the virtual function of the I/O device via a VF driver, thereby detecting a failure which has occurred in the virtual function,
the failure detection method comprising:
a first step of detecting, by the at least one virtual computer, occurrence of the failure in the virtual function;
a second step of acquiring, by the at least one virtual computer, a virtual device name corresponding to the virtual function in which the failure has occurred;
a third step of referring, by the at least one virtual computer, to device information retaining a virtual device name of the I/O device assigned to the at least one virtual computer and VF specific information on the I/O device, thereby acquiring the VF specific information based on the acquired virtual device name;
a fourth step of transmitting, by the at least one virtual computer, the acquired VF specific information to the host;
a fifth step of referring, by the host, to I/O correspondence information retaining a slot number of a slot in which the I/O device is mounted, and VF specific information, thereby acquiring the slot number corresponding to the VF specific information received from the at least one virtual computer; and
a sixth step of identifying, by the host, the acquired slot number as the slot number of the I/O device on which the failure has occurred.

9. The failure detection method for an SR-IOV compliant device according to the claim 8, wherein:
the I/O correspondence information contains, in addition to the slot number of the slot in which the I/O device is mounted and the VF specific information, a device name of the I/O device, and a VF name of the virtual function;
the fifth step comprises referring, by the host, to the I/O correspondence information, thereby acquiring, in addition to the slot number corresponding to the received VF specific information, the device name of the I/O device and the VF name of the virtual function; and
the sixth step comprises identifying, by the host, the acquired slot number, the device name of the I/O device, and the VF name of the virtual function as the slot number of the I/O device on which the failure has occurred, the device name of the I/O device, and the VF name of the virtual function.

10. The failure detection method for an SR-IOV compliant device according to the claim 8, wherein the device information uniquely associates the virtual device name and the VF specific information with each other.

11. The failure detection method for an SR-IOV compliant device according to the claim 8, wherein:
the I/O correspondence information contains, in addition to the slot number of the slot in which the I/O device is mounted and the VF specific information, a device name of the I/O device, and a port number corresponding to the virtual function;
the fifth step comprises referring, by the host, to the I/O correspondence information, thereby acquiring, in addition to the slot number corresponding to the received VF specific information, the device name of the I/O device and the port number corresponding to the virtual function; and
the sixth step comprises identifying, by the host, the acquired slot number, the device name of the I/O device, and the port number corresponding to the virtual function as the slot number of the I/O device on which the failure has occurred, the device name of the I/O device, and the port number corresponding to the virtual function.

12. The failure detection method for an SR-IOV compliant device according to the claim 8, wherein:
the I/O correspondence information contains, in addition to the slot number of the slot in which the I/O device is mounted and the VF specific information, a device name of the I/O device, a VF name of the virtual function, and a port number corresponding to the VF name;
the fifth step comprises referring, by the host, to the I/O correspondence information, thereby acquiring, in addition to the slot number corresponding to the received VF specific information, the device name of the I/O device, the VF name of the virtual function, and the port number corresponding to the virtual function; and
the sixth step comprises identifying, by the host, the acquired slot number, the device name of the I/O device, the VF name of the virtual function, and the port number corresponding to the virtual function as the slot number of the I/O device on which the failure has occurred, the device name of the I/O device, the VF name of the virtual function, and the port number corresponding to the virtual function.

13. The failure detection method for an SR-IOV compliant device according to the claim 8, wherein the host further includes a host OS and a virtualization module operated by the host OS.

14. The failure detection method for an SR-IOV compliant device according to the claim 8, wherein the sixth step comprises transmitting, by the host, the acquired slot number as the slot number of the I/O device on which the failure has occurred, and an identifier of the physical computer.

* * * * *